United States Patent Office 2,831,873
Patented Apr. 22, 1958

2,831,873

TESTOSTERONE 4,4-DIMETHYL PENTANOATE

Ellis Rex Pinson, Jr., and Gerald D. Laubach, Jackson Heights, N. Y., assignors to Chas. Pfizer & Co., Inc., Brooklyn, N. Y., a corporation of Delaware No Drawing. Application October 13, 1954
Serial No. 462,104

1 Claim. (Cl. 260—397.4)

This invention is concerned with certain novel compounds useful because of their high androgenic activity and because of the long duration of that activity. It is also concerned with the preparation of these new compounds.

It has long been known to the art that certain esters of androgenic alcohols such as testosterone exhibit activity of longer duration than do the free alcohols from which they are prepared (see U. S. Patent 2,109,400). It has now been discovered that a particular kind of ester, heretofore unknown, has great advantages over previously known ones. These new esters combine high androgenic activity with unprecented duration of that activity. They also have the advantage of physical properties making them suitable for being injected into patients both in the form of an oil solution and of an aqueous crystal suspension.

These new esters are characterized by being derived from acids having the formula

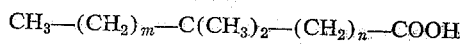

wherein $m$ is a number from zero to eight inclusive, $n$ is a number from two to ten inclusive, and the sum of $m$ and $n$ is less than fourteen.

This invention is all the more surprising in view of the fact that esters of androgenic alcohols and of acids in which $n$ in the above formula is zero or one are completely inactive when injected into animals.

Testosterone and a number of steriod compounds closely related to it possess great androgenic activity. The formula for testosterone is

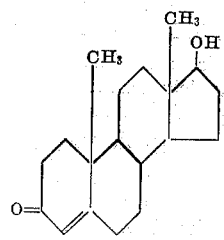

The compound 19-nortestosterone, which has the formula

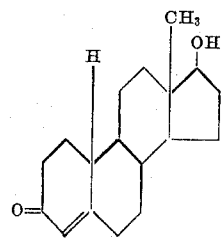

and the compound 4,5-dihydrotestosterone, which has the formula

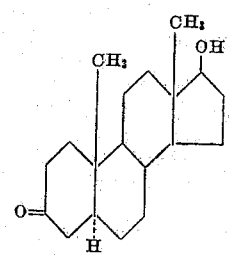

are androgens. Like testosterone, they each have a hydroxyl group at the 17β-position and may readily be used to prepare these novel esters.

For convenience, throughout this paragraph the term "useful acid" is used to mean an acid which meets the requirements of the formula given above for the acids used in this invention. No unusual or particular process need be employed to make an ester of an androgenic alcohol and a useful acid. Any of the well known, standardized procedures works. The steroid androgenic alcohol may be acylated with such acylating agents as the useful acid itself, the acyl halide of a useful acid, the acid anhydride of a useful acid and the lower molecular weight alkyl esters, e. g. the methyl ester, of a useful acid. Transesterification also works. In this process a low molecular weight ester, e. g. the acetate, of an androgenic alcohol is reacted with an ester of a useful acid and of a low molecular weight alcohol, e. g. methanol. A reaction analogous to double decomposition takes place, resulting in the formation of an ester of an androgenic alcohol and of a useful acid, with the formation of a low boiling by-product, methyl acetate for example, which is removed by gentle heating under reduced pressure to force the reaction to completion. Although in transesterification an ester rather than the androgenic alcohol itself is the starting material, it is to be understood that this process, as well as the other esterification processes, is included in the expression "esterifying a steroid anhydrogen selected from the group consisting of testosterone, 19-nortestosterone and 4,5-dihydrotestosterone with a reagent which contains the structure

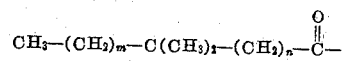

wherein $m$ is a number from zero to eight inclusive, $n$ is a number from two to ten inclusive, and the sum of $m$ and $n$ is less than fourteen."

It is well known that the esterification process may be catalyzed by such materials as ion-exchange resins, and minor proportions of strong acids or alkalies, either organic or inorganic. Naturally the selection of the catalyst must be such that the catalyst does not cause undesirable side reactions. The use of catalytic amounts of a base or acid for speeding the esterification process is, of course, not necessary when an acylating agent such as an acid anhydride or acid halide is used. The agents of this latter group may be utilized in the presence of an organic base such as pyridine, dimethylaniline, quinoline, etc.

In operating the process, it is advisable to use a solvent, if an organic base such as pyridine is not used for this purpose. Inert organic solvents, such as benzene, chloroform, toluene, etc. may be used. The application of heat often assists in speeding the reaction to its completion, but caution should be observed when an acyl halide is being employed. Optimum conditions for the reaction will, of course, vary somewhat with the particular androgen and acetylating agent employed, but the ester products of the present invention may be obtained in crystalline form and in good yield without great difficulty.

Each of the esters of this present invention, i. e. esters of an androgenic alcohol selected from the group consisting of testosterone, 19-nortestosterone and 4,5-dihydrotestosterone, and of an acid having the formula

$$CH_3-(CH_2)_m-C(CH_3)_2-(CH_2)_n-COOH$$

wherein $m$ is a number from zero to eight inclusive, $n$ is a number from two to ten inclusive, and the sum of $m$ and $n$ is less than fourteen, is extremely useful. The esters are all high melting and exist as hard crystals. For this reason they, unlike previously reported compounds, may be injected into patients in the form of aqueous crystal suspension. The crystals so used may be obtained either upon direct crystallization or by milling the crystals (possible because of their hardness) to the desired size. These compounds have the added advantage of also being suitable for injection into patients in oil solution, for example using sesame oil, peanut oil, or other commonly used oil as the solvent. Most significantly, these esters exert powerful androgenic effect of unprecedented duration. The esters in the present invention may be administered in a variety of other pharmaceutically acceptable carriers, that is any medium which is not deleterious to the compounds themselves, nor to the patient. The nature of the vehicle will depend on the chosen route of administration, but the choice of vehicle follows accepted pharmaceutical practices.

This long duration of androgenic activity is illustrated by the following chart. Castrated rats were each given a single injection of a sesame oil solution of a testosterone ester containing the equivalent (calculated from molecular weights) of five milligrams of testosterone. Control rats were given an injection of plain sesame oil. At the end of two, four and six weeks, rats were sacrificed and the weight of the ventral prostate gland determined.

WEIGHT (mg.) OF VENTRAL PROSTATE AFTER WEEKS

|  | 2 | 4 | 6 |
|---|---|---|---|
| control | 16.7 | 8.9 | 6.7 |
| testosterone propionate | 40.6 | 10.4 | 7.2 |
| testosterone 4,4-dimethylpentanoate | 189.4 | 186.4 | 119.3 |

The following examples are given solely for the purpose of illustration and are not to be construed as limitations of this invention, many variations of which are possible without departing from the spirit or scope thereof.

Example I

Three grams (10.8 millimoles) of testosterone was dissolved in 6 ml. of freshly distilled pyridine and the solution was chilled to 0° C. 1.75 grams (1.1 molar equivalents) of 4,4-dimethylpentanoyl chloride was added dropwise, and the mixture was allowed to stand 18 hours at room temperature. The mixture was added in a steady stream to 100 ml. of ice cold 3 N sulfuric acid and extracted three times with chloroform. The extracts were combined, washed successively with 1 N sulfuric acid, saturated aqueous sodium bicarbonate, and water. The chloroform solution was then filtered through a supercel precoated funnel and concentrated in vacuo to dryness. 2.3 grams of crystals were obtained upon trituration of the crude residue. Recrystallization from methanol gave colorless prisms, having the following physical constants:

M. P. 130.9—131.3° C.
$[\alpha]_D^{25}+98.7$ (0.55 $CHCl_3$)
$\lambda_{max}$, 240 mu.

When applied to 19-nortestosterone and 4,5-dihydrotestosterone, this procedure resulted in the formation of the corresponding ester in each case.

Example II

A solution of one part of testosterone in four parts of dry pyridine was refluxed with 1.5 parts of 4,4-dimethylpentanoic acid anhydride for 2 hours. The reaction mixture was then poured into water. The ester crystallized and was removed by filtration. After recrystallization from methanol the product, testosterone 4,4-dimethylpentanoate, was found to be identical with the product of Example I.

When applied to 19-nortestosterone and 4-dihydrotestosterone, this procedure resulted in the formation of the corresponding ester in each case.

Example III

Testosterone acetate was dissolved in toluene containing 2% hydrogen chloride. An equivalent amount of methyl 4,4-dimethylpentanoate was added, and the mixture was warmed gently at about 40° C. for 4 hours, at the end of which time the pressure was lowered and methyl acetate distilled over. The toluene solvent was also distilled over, and the crystalline residue was recrystallized from ethanol. The crystals obtained were testosterone 4,4-dimethylpentanoate.

In similar fashion ester interchange reactions were used with comparable results to prepare esters of 19-nortestosterone and of 4,5-dihydrotestosterone.

Example IV

By the above described methods, esters of other acids and of testosterone, 19-nortestosterone and 4,5-dihydrotestosterone were prepared. These other acids included, for example, 5,5-dimethylhexanoic acid, 4,4-dimethylhexanoic acid, 4,4-dimethylheptanoic acid, 5,5-dimethylheptanoic acid, 6,6-dimethylheptanoic acid, etc. The syntheses of these acids and of the others having the required formula presented no difficulty, and well known, standardized methods were used.

What is claimed is:
Testosterone 4,4-dimethylpentanoate.

References Cited in the file of this patent

UNITED STATES PATENTS

| 2,109,400 | Miescher | Feb. 22, 1938 |
| 2,143,453 | Ruzicka | Jan. 10, 1939 |
| 2,173,337 | Miescher | Sept. 19, 1939 |

FOREIGN PATENTS

| 208,889 | Switzerland | May 16, 1940 |
| 208,890 | Switzerland | May 16, 1940 |
| 208,899 | Switzerland | June 1, 1940 |